United States Patent [19]
Wright et al.

[11] Patent Number: 5,776,521
[45] Date of Patent: Jul. 7, 1998

[54] APPARATUS FOR FORMING THREADED MOULDED ARTICLES

[75] Inventors: John B. Wright, Alliston; Mark W. Burrows, Georgetown, both of Canada

[73] Assignee: Zygo Mould Limited, Etobicoke, Canada

[21] Appl. No.: 645,625

[22] Filed: May 14, 1996

[51] Int. Cl.$^6$ .................................................. B29C 45/44
[52] U.S. Cl. .......................... 425/556; 264/318; 264/334; 425/809; 425/DIG. 58
[58] Field of Search .................... 425/556, 809, 425/DIG. 58; 264/334, 318

[56]        References Cited

U.S. PATENT DOCUMENTS

| | | | |
|---|---|---|---|
| 5,383,780 | 1/1995 | McCready et al. | 425/556 |
| 5,421,717 | 6/1995 | Hynds | 425/556 |
| 5,518,679 | 5/1996 | Junk | 425/DIG. 58 |

*Primary Examiner*—Tim Heitbrink
*Attorney, Agent, or Firm*—Baker & Daniels

[57]        ABSTRACT

An apparatus for forming a moulded article includes a stationary mould core with an external threaded surface. A female mould surrounds a portion of the mould core including the threaded surface in a mould closed condition to define a mould cavity between the mould core and the female mould. Molten plastic is injected into the mould cavity to form the moulded article. A rotatable sleeve surrounds the mould core and engages with the moulded article formed in the mould cavity. The sleeve carries a gear wheel which meshes with a pinion. A rack is associated with the pinon and is moveable linearly to impart rotation of the pinion and in turn the sleeve. A lead screw on the sleeve engages a lead screw nut to cause the sleeve to displace axially along the mould core as the sleeve rotates. Lugs on the sleeve engages the moulded article and causes it to rotate with the sleeve so that the moulded article unscrews from the mould core allowing it to be ejected from the apparatus.

23 Claims, 4 Drawing Sheets

APPARATUS FOR FORMING THREADED MOULDED ARTICLES

FIELD OF THE INVENTION

The present invention relates to injection moulding and in particular to an apparatus for forming threaded moulded articles and to an unscrewing mechanism for the same.

BACKGROUND OF THE INVENTION

Injection moulds for forming threaded moulded articles are known in the art. Injection moulds of this type include a female mould which surrounds a mould core. A mould cavity is defined by the space between the female mould and mould core into which molten plastic is injected to form the moulded article.

In operation, molten plastic is injected into the mould cavity to form the moulded article. While the molten plastic is being injected into the mould cavity, coolant is circulated through cooling channels in the injection mould to cool rapidly the moulded article. Once the moulded article is cooled, the injection mould is conditioned to a mould open condition. During transition of the injection mould from the mould closed condition to the mould open condition, the female mould and the mould core are moved relative to one another to allow the moulded article to be ejected from the injection mould.

One common type of injection mould includes a rotating mould core to unscrew the moulded article from the mould core so that it may be ejected from the injection mould. Unfortunately, this design suffers from drawbacks in that rotary seals are required to seal the cooling channels in the mould core. These seals typically suffer from wear resulting in fluid leakage and reduced cooling of the mould core. Moreover, due to the complexity of these injection moulds, replacing the seals is a time consuming and therefore a costly exercise.

To deal with this problem, injection moulds having stationary mould cores have been developed. For example, U.S. Pat. No. 5,421,717 to Hynds and assigned to Husky Injection Moulding Systems Ltd. discloses an apparatus for forming threaded moulded articles having a stationary mould core surrounded partially by a female mould to define a mould cavity therebetween. The apparatus also includes a moveable ejection mechanism for loosening a moulded article formed in the mould cavity and then for ejecting the moulded article from the injection mould. The ejection mechanism includes a pinion having a pinion gear thereon which meshes with teeth on a stripper ring. The pinion has teeth at one end which mesh with a rack. The rack is attached to a cross-member which also accommodates a cam. The rack is reciprocated by two separate sources, namely a camming mechanism which operates during the first quarter of the ejection process and a pneumatic cylinder which operates during the remainder of the ejection process. The camming mechanism functions to initiate the ejection process by breaking the moulded article loose from the mould cavity while the pneumatic cylinder completes the ejection process. As will be appreciated, the ejection mechanism is complicated.

It is therefore, an object of the present invention to provide a novel apparatus for forming threaded moulded articles and an unscrewing mechanism for the same.

SUMMARY OF THE INVENTION

According to one aspect of the present invention there is provided an apparatus for forming a threaded moulded article comprising:

- a stationary mould core having an external threaded surface;
- a female mould surrounding a portion of said mould core including said threaded surface in a mould closed condition to define a mould cavity between said mould core and said female mould into which molten plastic is injected to form said moulded article;
- a rotatable sleeve surrounding said mould core and engageable with a moulded article formed in said mould cavity; and
- drive means to rotate and axially displace said sleeve relative to said mould core to unscrew said moulded article from said threaded surface when said female mould is in a mould open condition spaced from said mould core.

In a preferred embodiment, the drive means includes a lead screw on the sleeve cooperating with a stationary lead screw nut, the lead screw and lead screw nut causing the sleeve to displace axially upon rotation thereof. It is also preferred that the drive means further includes a pinion in mating engagement with a gear wheel on the sleeve, a rack movable linearly to impart rotation of the pinion so that the pinion imparts rotation of the sleeve, and a hydraulic cylinder to move the rack. It is also preferred that the sleeve and the mould core are configured to vent the mould cavity during axially displacement of the sleeve.

According to another aspect of the present invention there is provided an apparatus for forming moulded articles comprising:

- a plurality of injection moulds, each of said injection moulds including a stationary mould core having an external threaded surface; a female mould surrounding a portion of said mould core including said threaded surface in a mould closed condition to define a mould cavity between said mould core and said female mould into which molten plastic is injected to form said moulded article; and a rotatable sleeve surrounding said mould core and engageable with a moulded article formed in said mould cavity; and
- drive means to rotate and axially displace said sleeves relative to said mould cores to unscrew said moulded articles from said threaded surfaces when said female moulds are in a mould open condition spaced from said mould cores.

In still yet another aspect of the present invention there is provided an apparatus for forming moulded articles comprising:

- a plurality of sets of injection moulds, said sets being arranged in rows, each injection mould in a set including a stationary mould core having an external threaded surface; a female mould surrounding a portion of said mould core including said threaded surface in a mould closed condition to define a mould cavity between said mould core and said female mould into which molten plastic is injected to form said moulded article; and a rotatable sleeve surrounding said mould core and engageable with a moulded article formed in said mould cavity, said sleeve having a lead screw on an outer surface thereof;
- stationary lead screw nuts in mating engagement with said lead screws to cause axial displacement of said sleeves during rotation thereof, said sleeves unscrewing said moulded articles from said threaded surfaces during rotational and axial movement thereof;
- a pinion associated with each set of injection moulds and rotatable to impart rotation of the sleeves of the injection moulds in said associated set; and a rack associated with each row of sets, each rack being moveable linearly to impart rotation of the pinions in said row.

According to still yet another aspect of the present invention there is provided an unscrewing mechanism for an injection mould having a stationary mould core with an external threaded surface and a female mould surrounding a portion of the mould core including the threaded surface in a mould closed condition to define a mould cavity between the mould core and the female mould into which molten plastic is injected to form a moulded article, said unscrewing mechanism comprising:

a rotatable sleeve surrounding said mould core and engageable with a moulded article formed in said mould cavity; and drive means to rotate and axially displace said sleeve relative to said mould core to unscrew said moulded article from said threaded surface.

The present invention provides advantages in that since the mould core is stationary, rotary seals are not required. Since rotary seals are not required, the mould core can be physically larger allowing for better cooling in the mould core. Also, the present apparatus is of a simple and unique design which obviates the need for double acting pneumatic pistons which act on and move a stripper plate and the need for a camming mechanism to control the rate at which the stripper plate is moved. Since the present apparatus is less complicated than prior art designs, the apparatus is less prone to failure, less expensive to manufacture and easier and less costly to maintain.

BRIEF DESCRIPTION OF THE DRAWINGS

An embodiment of the present invention will now be described more fully with reference to the accompanying drawings in which.

DESCRIPTION OF THE PREFERRED EMBODIMENTS

Figure 1:
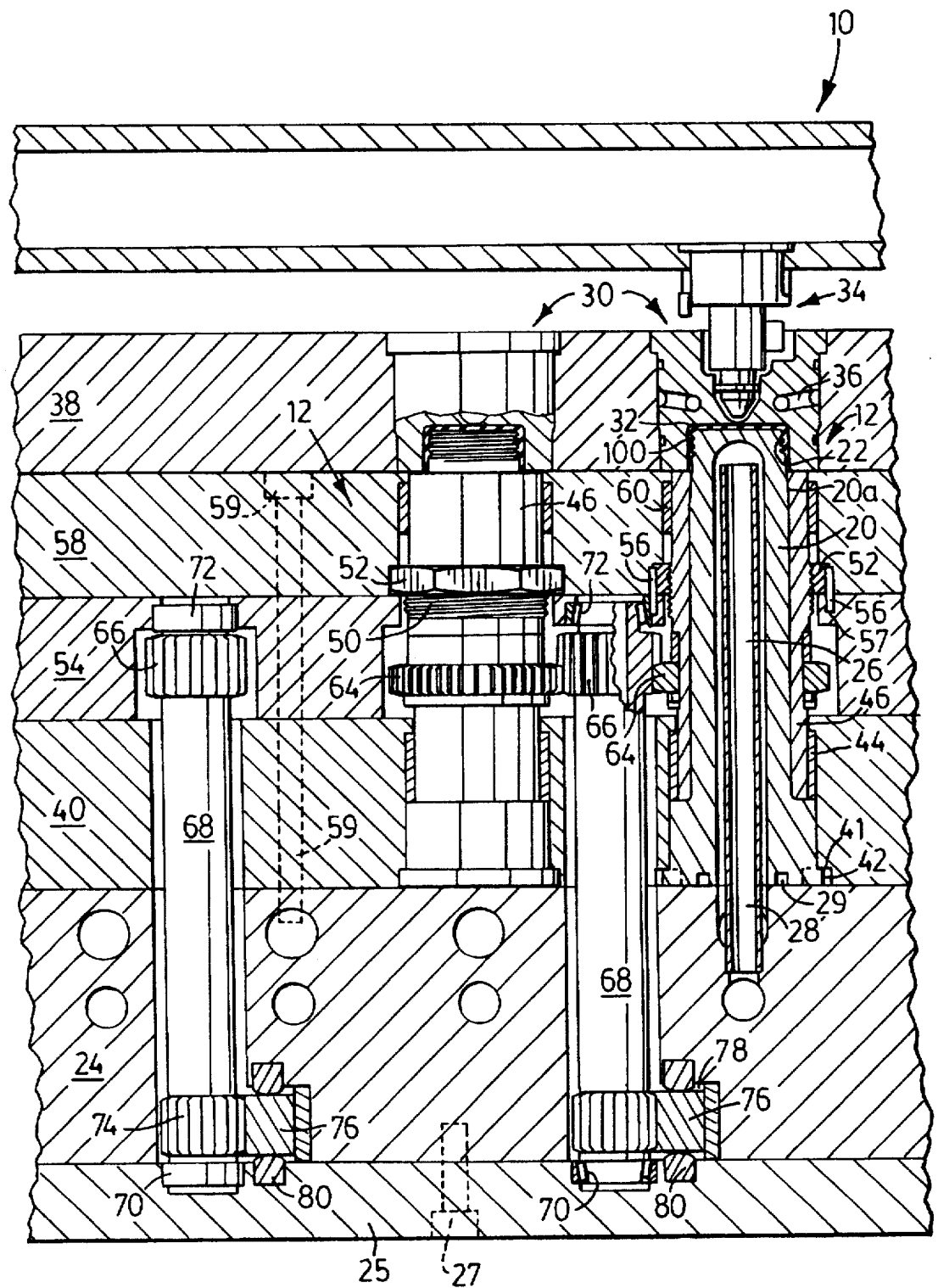
FIG. 1 is a side elevational view partly in cross-section of an apparatus for forming threaded moulded articles in accordance with the present invention showing a plurality of injection moulds in a mould closed condition.
Figure 2:
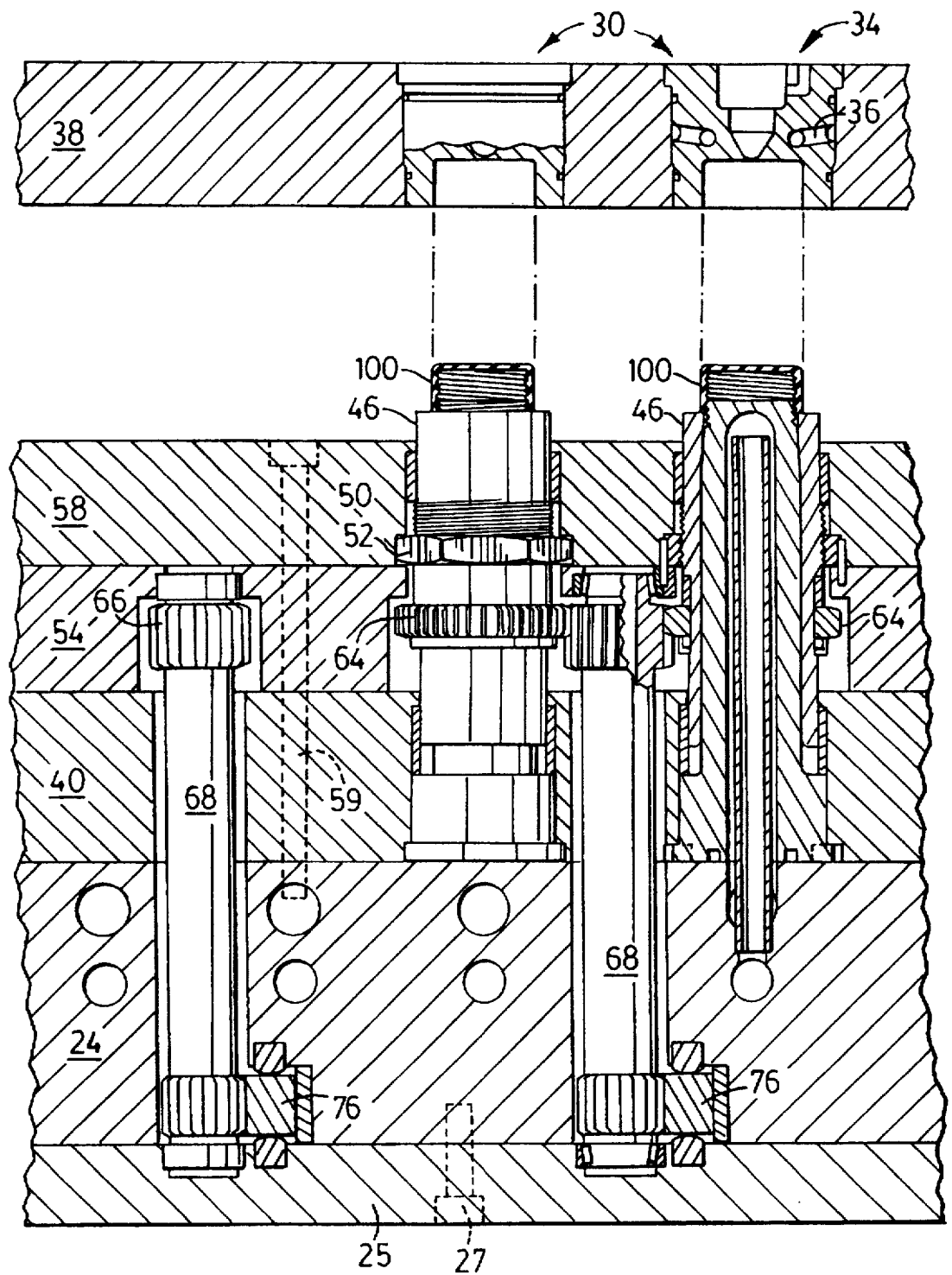
FIG. 2 is a side elevational view partly in cross-section of the apparatus of FIG. 1 showing the injection moulds in a mould open condition.
Figure 3:
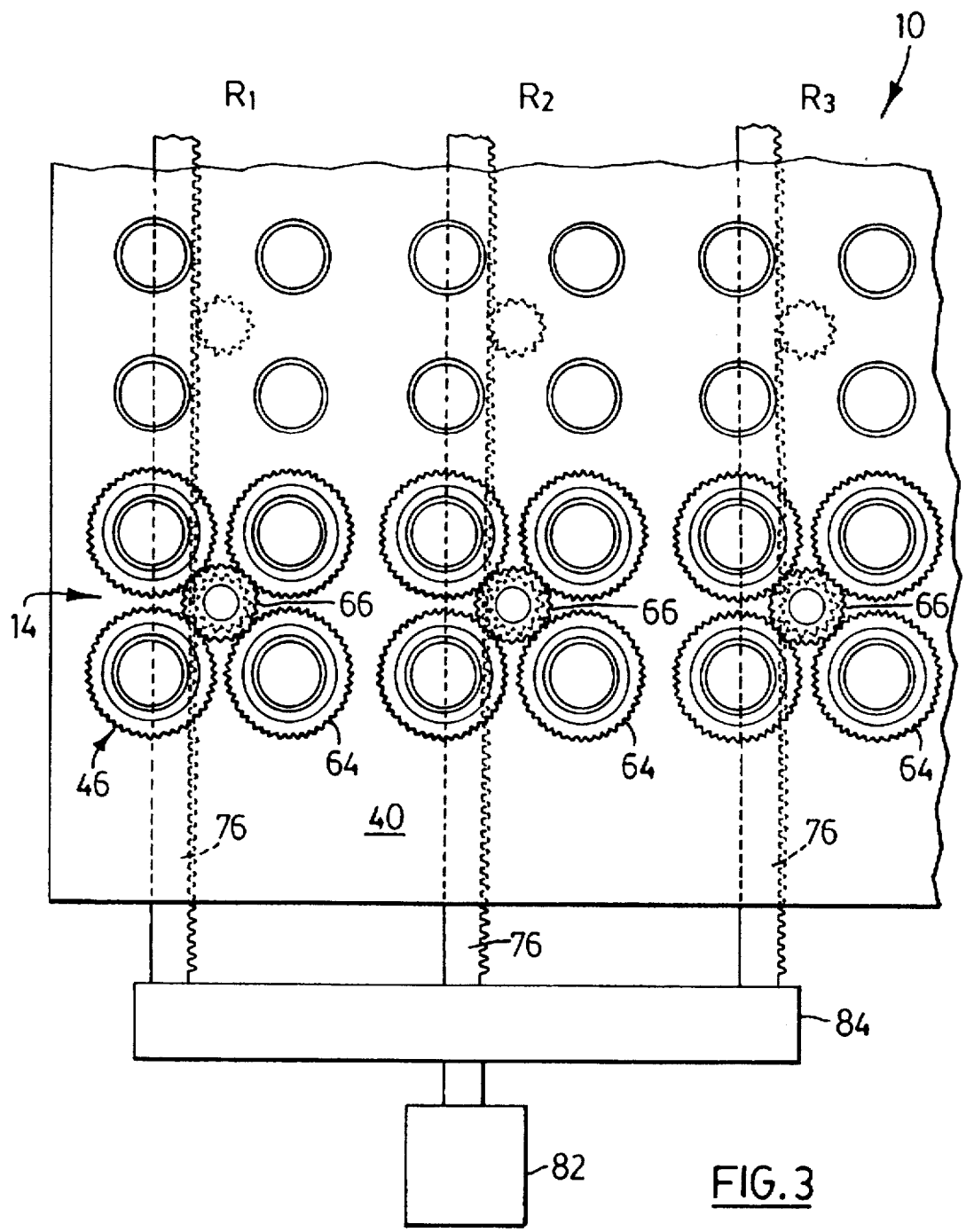
FIG. 3 is a cross-sectional view of the apparatus of FIG. 2 taken along line 3—3.
Figure 4:
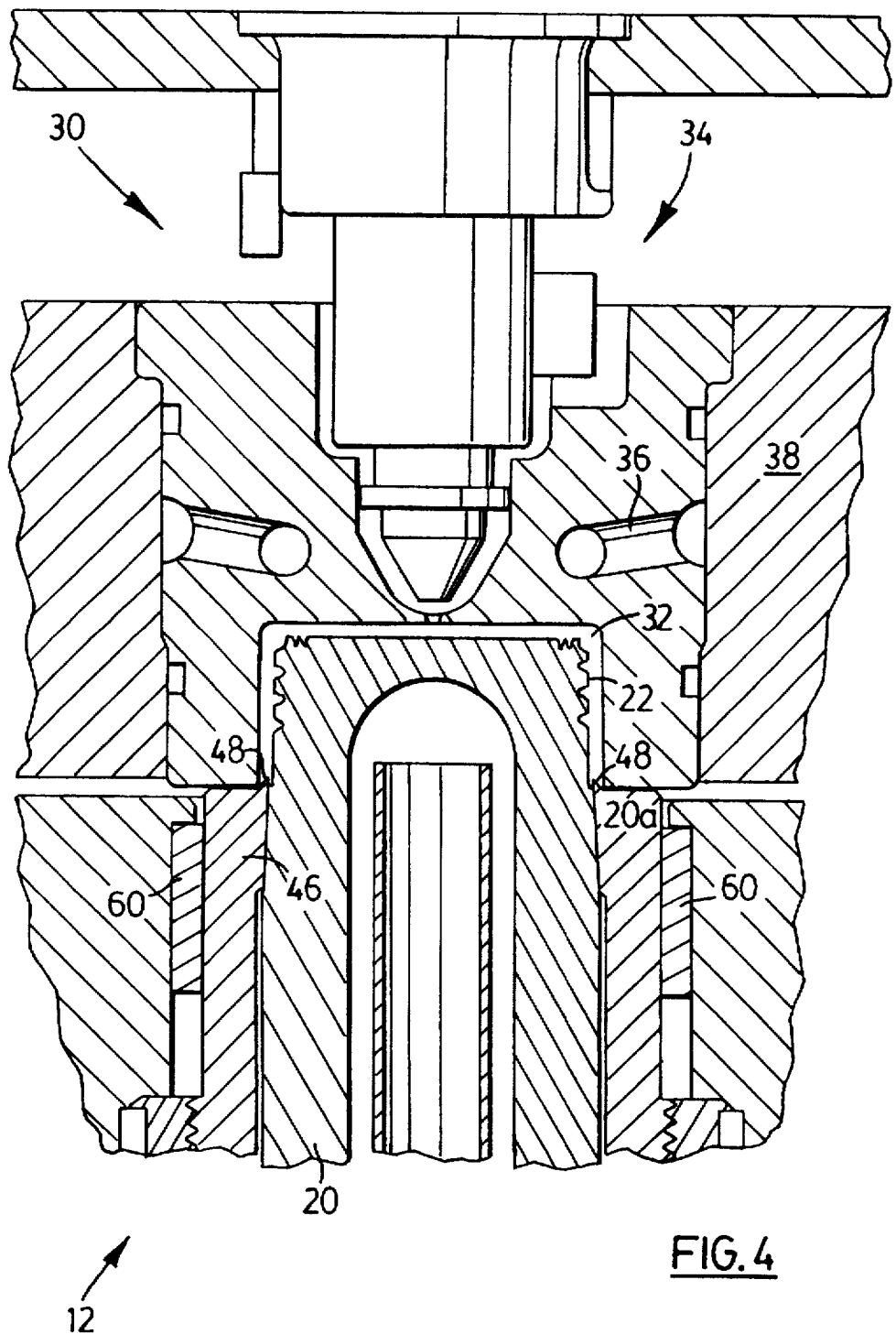
FIG. 4 is an enlarged side elevational view of a portion of FIG. 1.

Referring now to FIGS. 1 to 4, an apparatus for forming threaded moulded articles in accordance with the present invention is shown and is generally indicated to by reference numeral 10. As can be seen, the apparatus 10 includes a plurality of injection moulds 12. The injection moulds 12 are arranged in sets 14 with each set in this example, including four injection moulds. Although FIG. 3 shows six sets 14 of injection moulds 12 arranged in three row $R_1$, $R_2$ and $R_3$, this is for illustrative purposes only. Those of skill in the art will appreciate that the apparatus 10 will typically include a significant number of rows, each row having a significant number of sets of injection moulds 12. Also, although each set is shown to include four injection moulds, the number of injection moulds in each set may vary depending on the size of the moulded articles being formed. In particular, for small moulded articles, the number of injection moulds per set will typically be greater and for large moulded articles, the number of injection moulds per set will typically be smaller.

In FIG. 1, two injection moulds 12 in one of the sets 14 are illustrated with the injection moulds being in a mould closed condition. For ease of reference, one of the injection moulds 12 will now be described more fully. It should however be appreciated that all of the injection moulds 12 in the apparatus 10 are basically identical.

As can be seen, each injection mould 12 includes a stationary elongate mould core 20 having an external threaded surface 22. The mould core 20 is disposed on a fixed core plate 24 and has a tapered outer surface 20a which increases gradually in diameter towards the fixed core plate. A bottom plate 25 is disposed below the fixed core plate. The bottom plate 25 and the fixed core plate 24 are secured together by fasteners 27 (one of which is shown). The mould core 20 has cooling channels 26 within it which communicate with cooling channels 28 formed in the fixed core plate 24. Cooling channels 26 and 28 receive a flow of coolant, such as for example water, to cool a moulded article being formed in the injection mould 12. A stationary O-ring seal 29 is accommodated by the mould core 20 and surrounds the cooling channels 26.

A female mould 30 surrounds a portion of the mould core 20 in a manner to define a mould cavity 32 therebetween. An injection nozzle 34 is provided in the female mould 30 to allow molten plastic to be injected into the mould cavity 32 so that a threaded moulded article may be formed therein. Cooling channels 36 are also provided in the female mould 30 to receive a flow of coolant to cool the moulded article being formed in the mould cavity 32. A cavity plate 38 surrounds the female mould 30.

A bottom bearing plate 40 overlies the fixed core plate 24 and has counterbores 41 formed therein. The counterbores 41 accommodate dowels 42 on the mould core 20 to inhibit rotational movement of the mould core 20. Bearings 44 are accommodated by the bearing plate 40 and contact a rotatable, generally cylindrical sleeve 46 which surrounds the mould core 20 beneath the female mould 30. The top surface of the sleeve 46 has lugs 48 formed on it which enter the mould cavity 32 (best seen in FIG. 4). The outer surface of the sleeve 46 has a lead screw 50 formed thereon which engages a stationary lead screw nut 52. Lead screw nut 52 has dowels 56 on it which are accommodated by counterbores 57 in lead screw retaining plate 54 to inhibit rotational movement of the lead screw nut 52. The lead screw retaining plate 54 overlies the bottom bearing plate 40. Above the lead screw retaining plate 54 is a top bearing plate 58 accommodating bearings 60 which contact the sleeve 46. The bearings 44 and 60 facilitate rotational movement of the sleeve 46 within the injection mould 12 and provide support for the sleeve 46 at its opposed ends by way of fasteners 56. Fasteners 59 (one of which is shown) pass through the top bearing plate 58, lead screw retaining plate 54, bottom bearing plate 40 and engage the fixed core plate 24 to secure the plates together.

A gear wheel 64 is also provided on the outer surface of the sleeve 46 adjacent the lead screw retaining plate 54. The teeth of the gear wheel 64 mesh with teeth 66 provided on a pinion 68 adjacent one end thereof. Pinion 68 passes through the fixed core plate 24, the bottom bearing plate 40 and the lead screw retaining plate 54. Bearings 70 and 72 accommodated by the bottom plate 25 and lead screw retaining plate 54 respectively contact opposite ends of the pinion 68 to facilitate rotation thereof. Teeth 74 are also provided on the pinion 68 adjacent its other end. The teeth 74 mesh with a toothed rack 76 accommodated in a channel 78 formed in the fixed core plate 24. Roller bearings 80 in the fixed core plate 24 and bottom plate 25 facilitate reciprocal movement of the rack 76 within the channel 78.

Turning now to FIG. 3, although only one injection mould 12 has been described, the apparatus 10 includes a plurality of pinions 68, each pinion being associated with a set 14 of injection moulds 12. Also, the apparatus 10 includes a plurality of racks 76, each rack 76 being associated with a different row of sets of injection moulds 12. The racks 76 are joined by a crossbar 84. A hydraulic cylinder 82 acts on the crossbar 84 to reciprocate the racks 76.

The operation of the apparatus 10 will now be described with reference to FIGS. 1 to 4. Initially, the injection moulds 12 are in a mould closed condition as shown in FIG. 1. Molten plastic is injected into the mould cavity 32 of each injection mould 12 by way of the injection nozzles 34. The molten plastic takes the form of the mould cavities 32 and thereby forms the moulded articles identified in FIG. 3 by reference numeral 100. While the molten plastic is being injected into the mould cavities 32, coolant is circulated through the cooling channels 26, 28 and 36 to cool rapidly the moulded articles being formed. Once the moulded articles are cooled, apparatus 10 is operated to bring the injection moulds 12 to a mould open condition as shown in FIG. 2 to allow the moulded articles to be ejected from the apparatus 10.

During transition of the apparatus 10 from the mould closed condition of FIG. 1 to the mould open condition of FIG. 2, the female mould 30 and cavity plate 38 are lifted from the mould core 20. At this time, the hydraulic cylinder 82 is actuated to pull on the crossbar 84 and hence the racks 76 so that the racks 76 move linearly along the channels 78 formed in the fixed core plates 24. As the racks 76 move linearly, the teeth on the racks mesh with the teeth 74 on the pinions 68 causing the pinions 68 to rotate. As the pinions 68 rotate, the teeth 66 on the pinions mesh with the gear wheels 64 on the sleeves 46 causing the sleeves 46 to rotate about the mould cores 20.

As the sleeves rotate, the lead screws 50 engage the lead screw nuts 52 causing the sleeves 46 to advance along the lead screw nuts and therefore move axially along the mould cores 20. While the sleeves 46 rotate and move axially, the lugs 48 on the sleeves 46 engage the threaded articles 100 surrounding the threaded surfaces 22 of the mould cores 20 causing the moulded articles 100 to rotate about the mould cores 20 and unscrew from the threaded surfaces 22. The tapering outer surfaces 20a of the mould cores 20 and the generally cylindrical nature of the sleeves 46 provide vents for the mould cavities 32 as the sleeves 46 advance along the mould cores 20.

The racks 76 are pulled by the hydraulic cylinder 82 a sufficient distance to rotate the pinions 68 until the threaded articles 100 are at the ends of the mould cores 20 ready for removal from the injection moulds.

Once the moulded articles 100 have been ejected from the apparatus 10, the hydraulic motor 82 is actuated to move the racks 76 back to their initial positions. During this movement of the racks 76, the pinions 68 are rotated in the reverse direction causing the sleeves 46 to rotate and move axially along the mould cores 20 to return them to their original positions. At that time, the female moulds 34 and cavity plates 38 are brought over the mould cores 20 allowing the process to be performed again.

The present invention provides advantages in that the lead screws and lead screw nuts, which guide the sleeves as they advance along the mould cores, maintain the lugs in engagement with the moulded articles. As will be appreciated, the present invention provides a unique and uncomplicated unscrewing mechanism for an apparatus for forming moulded articles which eliminates the need for stripper plates, cams and cam followers.

Although a particular embodiment of the present invention has been described, those of skill in the art will appreciate that variations and modifications may be made thereto without departing from the spirit and scope thereof as defined by the appended claims.

We claim:

1. An apparatus for forming a threaded moulded article comprising:

a stationary mould core having an external threaded surface;

a female mould surrounding a portion of said mould core including said threaded surface in a mould closed condition to define a mould cavity between said mould core and said female mould into which molten plastic is injected to form said moulded article, said female mould being moveable relative to said mould core to a mould open condition where said female mould is spaced from said mould core;

a rotatable sleeve surrounding a portion of said mould core and engageable with a moulded article formed in said mould cavity; and drive means to move said female mould relative to said mould core and to rotate and axially displace said sleeve relative to said mould core to unscrew said moulded article from said threaded surface when said female mould is in said mould open condition, said drive means including a lead screw cooperating with a lead screw nut, one of said lead screw and lead screw nut being carried by said sleeve said lead screw and lead screw nut causing said sleeve to displace axially upon rotation thereof.

2. An apparatus as defined in claim 1 wherein said lead screw is carried by said sleeve.

3. An apparatus as defined in claim 2 wherein said drive means further includes a pinion in mating engagement with a gear wheel on said sleeve and a reciprocating rack movable to impart rotation of said pinion, said pinion imparting rotation of said sleeve upon rotation thereof by way of said gear wheel.

4. An apparatus as defined in claim 3 wherein said drive means further includes a hydraulic cylinder to reciprocate said rack.

5. An apparatus as defined in claim 2 wherein said lead screw nut is fixedly secured to a stationary lead screw retaining plate.

6. An apparatus as defined in claim 5 further including a top bearing plate on said lead screw retaining plate, said top bearing plate accommodating bearings acting between said top bearing plate and said sleeve.

7. An apparatus as defined in claim 1 wherein said sleeve has lugs formed thereon to engage s aid mould ed article.

8. An apparatus as defined in claim 1 wherein said sleeve and said mould core are configured to vent said mould cavity during axially displacement of said sleeve.

9. An apparatus for forming moulded articles comprising:

a plurality of injection moulds, each of said injection moulds including a stationary mould core having an external threaded surface; a female mould surrounding a portion of said mould core including said threaded surface in a mould closed condition to define a mould cavity between said mould core and said female mould into which molten plastic is injected to form said moulded article, said female mould being moveable relative to said mould core to a mould open condition where said female mould is spaced from said mould core; and a rotatable sleeve surrounding a portion of said mould core and engageable with a moulded article formed in said mould cavity; and drive means to move said female moulds relative to said mould cores and to rotate and axially displace said sleeves relative to said mould cores to unscrew said moulded articles from said threaded surfaces when said female moulds are in mould open conditions, said drive means including lead screws cooperating with lead screw nuts, one of said lead screws and lead screw nuts being carried by said sleeves, said lead screws and lead screw nuts causing said sleeves to displace axially upon rotation thereof.

10. An apparatus as defined in claim 9 wherein said drive means includes a pinion in mating engagement with gear wheels on the sleeves of said injection moulds and a reciprocating rack to impart rotation of said pinion, said pinion imparting rotation of said sleeves upon rotation thereof by way of said gear wheels.

11. An apparatus as defined in claim 10 wherein said drive means further includes a hydraulic cylinder to reciprocate said rack.

12. An apparatus as defined in claim 9 wherein said lead screws are carried by said sleeves.

13. An apparatus as defined in claim 12 wherein said sleeves have lugs formed thereon to engage said moulded articles.

14. An apparatus as defined in claim 13 wherein said sleeve and mould core are configured to vent said mould cavity during axial displacement of said sleeve.

15. An apparatus for forming moulded articles comprising:

a plurality of sets of injection moulds, said sets being arranged in rows, each injection mould in a set including a stationary mould core having an external threaded surface; a female mould surrounding a portion of said mould core including said threaded surface in a mould closed condition to define a mould cavity between said mould core and said female mould into which molten plastic is injected to form said moulded article, said female mould being moveable relative to said mould core to a mould open condition where said female mould is spaced from said mould core; and a rotatable sleeve surrounding a portion of said mould core and engageable with a moulded article formed in said mould cavity, said sleeve having a lead screw formed on an outer surface thereof, stationary lead screw nuts in mating engagement with said lead screws to cause axial displacement of said sleeves during rotation thereof, said sleeves unscrewing said moulded articles from said threaded surfaces during rotational and axial movement thereof when said female moulds are in said mould open condition;

a pinion associated with each set of injection moulds and rotatable to impart rotation of the sleeves of the injection moulds in said associated set; and a reciprocating rack associated with each row of sets, each rack being moveable to impart rotation of the pinions in said row.

16. An apparatus as defined in claim 15 further including at least one hydraulic cylinder to reciprocate said racks.

17. An apparatus as defined in claim 16 further including a crossbar joining said racks, said apparatus including a single hydraulic cylinder acting on said crossbar to reciprocate said racks.

18. An apparatus as defined in claim 15 wherein said sleeves and mould cores are configured to vent said mould cavities during axial displacement of said sleeves.

19. An unscrewing mechanism for an injection mould having a stationary mould core with an external threaded surface and a female mould surrounding a portion of the mould core including the threaded surface in a mould closed condition to define a mould cavity between the mould core and the female mould into which molten plastic is injected to form a moulded article, said female mould being moveable away from said mould core to a mould open condition, said unscrewing mechanism comprising:

a rotatable sleeve surrounding a portion of said mould core and engageable with a moulded article formed in said mould cavity; and drive means to rotate and axially displace said sleeve relative to said mould core to unscrew said moulded article from said threaded surface when said female mould is in said mould open condition, said drive means including a lead screw carried by said sleeve in mating engagement with a stationary lead screw nut, said lead screw and lead screw nut causing said sleeve to displace axially during rotational movement thereof.

20. An unscrewing mechanism as defined in claim 19 wherein said drive means further includes a pinion in mating engagement with a gear wheel on said sleeve; a reciprocating rack movable to impart rotation of said pinion, said pinion imparting rotation of said sleeve upon rotation thereof by way of said gear wheel; and a hydraulic cylinder to reciprocate said rack.

21. An unscrewing mechanism as defined in claim 19 wherein said sleeve and mould core are configured to vent said mould cavity during axial displacement of said sleeve.

22. An apparatus as defined in claim 21 wherein said lead screw is carried by said sleeve.

23. An apparatus as defined in claim 22 wherein said sleeve has lugs formed thereon to engage said moulded article.

* * * * *